US010207593B2

(12) United States Patent
Heuer et al.

(10) Patent No.: US 10,207,593 B2
(45) Date of Patent: Feb. 19, 2019

(54) MEANS AND METHODS FOR MAKING AN ASSOCIATIVE CONNECTION

(71) Applicant: Siemens Aktiengesellschaft, Munich (DE)

(72) Inventors: Joerg Heuer, Oberhaching (DE); Anton Schmitt, Vaterstetten (DE); Xi Zhang, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 15/316,363

(22) PCT Filed: Apr. 2, 2015

(86) PCT No.: PCT/EP2015/057293
§ 371 (c)(1),
(2) Date: Dec. 6, 2016

(87) PCT Pub. No.: WO2015/185244
PCT Pub. Date: Dec. 10, 2015

(65) Prior Publication Data
US 2018/0147949 A1    May 31, 2018

(30) Foreign Application Priority Data

Jun. 5, 2014   (DE) .................. 10 2014 210 813

(51) Int. Cl.
*B60L 11/18* (2006.01)
*H04B 7/24* (2006.01)
(Continued)

(52) U.S. Cl.
CPC ......... *B60L 11/1829* (2013.01); *B60L 11/182* (2013.01); *B60L 11/1833* (2013.01);
(Continued)

(58) Field of Classification Search
USPC ....................................................... 320/109
See application file for complete search history.

(56) References Cited

U.S. PATENT DOCUMENTS 9,184,830 B2    11/2015  Heuer et al.
2002/0041688 A1*  4/2002  Fredriksson ......... G05B 19/042
                                                        380/270
(Continued)

FOREIGN PATENT DOCUMENTS

CN    102834292 A     12/2012  ............. B60L 11/18
DE    102011116321 A1  5/2012  ............. B60L 11/18
(Continued)

OTHER PUBLICATIONS

Chinese Office Action, Application No. 201580029799.X, 7 pages, dated May 2, 2018.
(Continued)

*Primary Examiner* — Bryce M Aisaka
(74) *Attorney, Agent, or Firm* — Slayden Grubert Beard PLLC

(57) ABSTRACT

A method is provided in which a pair of transmitters having omnidirectional and directional transmission characteristics is provided when an associative connection is established between an electric vehicle and a charging station. Once the associative connection has been established in such a way that a directional radio link is formed, the associative connection is tested using an omnidirectional transmitter. The results of the testing may be used to prevent an unwanted associative connection to a compromising transmitter.

10 Claims, 1 Drawing Sheet

(51) Int. Cl.
*G01S 5/02* (2010.01)
*H02J 7/00* (2006.01)
*H04B 5/00* (2006.01)

(52) U.S. Cl.
CPC ....... *B60L 11/1838* (2013.01); *B60L 11/1846* (2013.01); *G01S 5/02* (2013.01); *H02J 7/0027* (2013.01); *H04B 7/24* (2013.01); *B60L 2230/10* (2013.01); *H04B 5/0037* (2013.01); *Y02T 10/7005* (2013.01); *Y02T 10/7088* (2013.01); *Y02T 90/121* (2013.01); *Y02T 90/122* (2013.01); *Y02T 90/125* (2013.01); *Y02T 90/128* (2013.01); *Y02T 90/14* (2013.01); *Y02T 90/163* (2013.01); *Y02T 90/169* (2013.01); *Y04S 30/14* (2013.01)

(56) References Cited

U.S. PATENT DOCUMENTS

| | | | |
|---|---|---|---|
| 2011/0254503 A1 | 10/2011 | Widmer et al. | 320/108 |
| 2012/0095830 A1 | 4/2012 | Contreras Delpiano et al. | 705/14.49 |
| 2012/0098483 A1 | 4/2012 | Patel | 320/108 |
| 2012/0109797 A1* | 5/2012 | Shelton | B60L 3/0069 705/34 |
| 2013/0049456 A1 | 2/2013 | Kim et al. | 307/9.1 |
| 2015/0165923 A1 | 6/2015 | Hirayama et al. | 455/90.1 |

FOREIGN PATENT DOCUMENTS

| | | | |
|---|---|---|---|
| DE | 102012204021 A1 | 9/2013 | B60L 11/18 |
| DE | 102012012860 A1 | 1/2014 | B60L 11/18 |
| WO | 2014/010447 A1 | 1/2014 | B60L 11/18 |
| WO | 2015/185244 A2 | 12/2015 | B60L 11/18 |

OTHER PUBLICATIONS

German Office Action, Application No. 102014210813.6, 8 pages, dated Jan. 12, 2015.
International Search Report and Written Opinion, Application No. PCT/EP2015/057293, 21 pages, dated Jul. 4, 2016.

* cited by examiner

MEANS AND METHODS FOR MAKING AN ASSOCIATIVE CONNECTION

CROSS-REFERENCE TO RELATED APPLICATIONS

This application is a U.S. National Stage Application of International Application No. PCT/EP2015/057293 filed Apr. 2, 2015, which designates the United States of America, and claims priority to DE Application No. 10 2014 210 813.6 filed Jun. 5, 2014, the contents of which are hereby incorporated by reference in their entirety.

TECHNICAL FIELD

The invention relates to means and methods for making an associative connection between an electric vehicle and an inductive charging station.

BACKGROUND

To charge an electric vehicle at a charging station, inductive charging systems are known. These involve coil systems being situated both on the underside of the electric vehicle and in the charging station on the ground. A magnetic alternating field that permeates this coil system is used to transmit power from the charging station to the electric vehicle by induction.

An inductive charging process can be performed after the electric vehicle is positioned on the charging station, without this requiring the vehicle driver to get out or a connection using a charging cable. To interchange position, identification and billing information, a communication link between the charging station and the electric vehicle has proved successful, which is maintained during the approach process and during the charging process when the electric vehicle is at a standstill.

In order to charge an electric vehicle by induction with low losses and little scattered radiation, it is necessary for the coil system of the charging station and the coil system of the electric vehicle to be positioned so as to overlap as exactly as possible. In addition, an explicit association needs to be made between the electric vehicle and the charging station. This explicit association or "associative connection" is required in order to ensure that the communication link is maintained only with that electric vehicle that is intended to be charged by induction on a predetermined charging station.

To ensure an explicit association between an electric vehicle and a charging station that is provided, there are already known methods. According to a proposal from the applicant that is disclosed in the document DE 102012012860 A1, there is provision for an associative connection to be provided between an electric vehicle and a charging station by virtue of an antenna on a vehicle being coupled to an antenna at the charging station, the arrangement of the vehicle antenna in relation to the charging station antenna being intended to ensure that only these two antennas can set up a shared connection. To this end, a directional characteristic of the charging station antenna is designed such that a signal radiated by the charging station antenna is receivable only in a prescribable area around a direct line of sight between the two antennas. In addition, there is provision for operation of the charging station antenna to be activated only when a prescribable area, particularly a charging position, is reached, in order to make it difficult to compromise the associative connection.

The issue of the associative connection being compromised that is addressed in the cited document has been found to be a problem in further field trials. As such, there is the risk of a transmitter in a radio area of the charging station behaving maliciously, posing as a remote station for an associative connection that is to be set up and, to this end, making its own transmission power exceed that of the inherently provided antenna of the charging station.

SUMMARY

One embodiment provides a method for making an associative connection between an electric vehicle and a charging station, comprising: setting up the associative connection between the electric vehicle and the charging station by forming a directional radio link; and checking the associative connection between the electric vehicle and the charging station in collaboration with an omnidirectional transmitter.

In one embodiment, the directional radio link is made between a directional transmitter arranged at the charging station and a directional transmitter arranged on the electric vehicle.

In one embodiment, the omnidirectional transmitter is arranged on the electric vehicle.

In one embodiment, the directional transmitter is arranged at a short distance from the omnidirectional transmitter.

In one embodiment, the associative connection is checked by comparing a transmission strength of the directional radio link with a transmission strength transmitted via the omnidirectional transmitter.

In one embodiment, the associative connection is checked by outputting a negative result if the transmission strength of the transmission strength transmitted via the omnidirectional transmitter exceeds the transmission strength of the directional radio link.

In one embodiment, the associative connection is broken in consequence of a negative result and/or an error message is output.

Another embodiment provides a connecting unit for making an associative connection between an electric vehicle and a charging station, comprising: an interface to at least one first transmitter, the first transmitter having an essentially directional transmission characteristic; and an interface to at least one second transmitter, the second transmitter having an essentially omnidirectional transmission characteristic; wherein the connecting unit is configured in collaboration with the first transmitter to set up an associative connection between the electric vehicle and the charging station; and wherein the connecting unit is configured in collaboration with the second transmitter to check the associative connection.

Another embodiment provides an electric vehicle comprising such a connecting unit.

BRIEF DESCRIPTION OF THE DRAWINGS

Example aspects and embodiments of the invention are explained in more detail below with reference to the drawing, in which.

DETAILED DESCRIPTION

Figure 1:
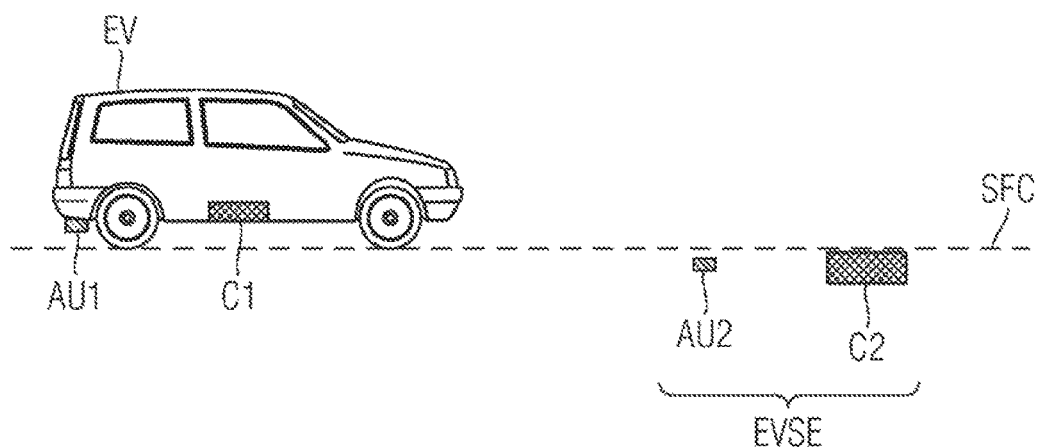
FIG. 1 shows a schematic representation of an electric vehicle approaching a charging station, according to an example embodiment.

Embodiments of the invention provide measures that ensure a compromise-proof associative connection between an electric vehicle and a charging station provided for the purpose of charging the electric vehicle.

Some embodiments provide a method for making an associative connection between an electric vehicle and a charging station that comprises the steps explained below. In a first step, the associative connection between the electric vehicle and the charging station is set up by forming a directional radio link. A directional radio link is intended to be understood to mean a radio link that has a directional characteristic provided in a predefined direction both at the transmitter and at the receiver. By way of example, a directional radio link extends in a lobe shape from a transmitter placed near the ground of the charging station in the direction of an underside of the electric vehicle. In a second step, the associative connection between the electric vehicle and the charging station is checked in collaboration with an omnidirectional transmitter. Said omnidirectional transmitter is intended to be understood to mean a transmitter, that is to say an antenna, for example, having a nondirectional, that is to say spherical, for example, directional characteristic.

While the directional radio link already known beforehand supports positioning of the electric vehicle such that a transmission strength measured on the vehicle, for example, progressively increases on account of the directional characteristic as a provided charging position is progressively approached, and finally takes a maximum value when the provided charging position is reached, the transmission strength measured on the vehicle, solely on the basis of the directional radio link, cannot be used to distinguish whether the radio link comes from the charging station provided for this purpose or from a further, compromising transmitter. This shortcoming is eliminated by the inventive step of checking the associative connection between the electric vehicle and the charging station in collaboration with an omnidirectional transmitter. A transmission strength, preferably measured on the electric vehicle, using the omnidirectional transmitter allows a comparison between the transmission strength of the omnidirectional radio link and the transmission strength of the directional radio link.

Other embodiments provide a connecting unit for making an associative connection between an electric vehicle and a charging station that comprises the functional groups explained below. The connecting unit has a first interface to at least one first transmitter, which has an essentially directional transmission characteristic. The connecting unit furthermore has a second interface to at least one second transmitter, which has an essentially omnidirectional, that is to say nondirectional, transmission characteristic. The connecting unit is configured in collaboration with the first transmitter to set up an associative connection between the electric vehicle and the charging station and further configured to check the associative connection in collaboration with the second transmitter.

Other embodiments provide an electric vehicle having an inventive connecting unit and also a charging station having an inventive connecting unit.

According to one embodiment, there is provision for the directional radio link to be made between a directional transmitter arranged at the charging station and a directional transmitter arranged on the electric vehicle.

According to a further embodiment, there is provision for the omnidirectional transmitter to be arranged on the electric vehicle.

Alternatively, an embodiment in which omnidirectional transmitters are arranged both on the electric vehicle and at the charging station is advantageous. Said embodiment ensures that a transmission, that is to say a respectively opposing transmission and reception mode on the two sides, that is to say at the charging station and on the electric vehicle, is effected symmetrically. This advantageous measure allows the provision of identical connecting units both on the electric vehicle and at the charging station.

According to a further embodiment, there is provision for the directional transmitter to be arranged at a short distance from the omnidirectional transmitter. This embodiment preferably relates to the electric vehicle, and alternatively also to the charging station. On account of the short distance according to this embodiment, a check on the associative connection is simplified such that essentially similar operating conditions prevail both for the directional radio link and for the omnidirectional radio link, said operating conditions facilitating the check on the associative connection.

According to a further embodiment, there is provision for the associative connection to be checked by comparing a transmission strength of the directional radio link with a transmission strength transmitted or ascertained via the omnidirectional transmitter. According to this embodiment of the invention, the transmission strength, that is to say signal strength or field strength, of the omnidirectional radio link is thus compared with that of the directional radio link. In this case, the check on the transmission strength is the most advantageous check on the associative connection. According to a further embodiment of the invention, there is provision for the associative connection to be checked by outputting a negative result if the transmission strength of the transmission strength transmitted or ascertained using the omnidirectional transmitter exceeds the transmission strength of the directional radio link. The reason is that in this case it can be assumed that a compromising further transmitter is attempting, with malicious intent, to overrule the radio signal sent by the charging station.

According to a further embodiment, there is provision for the associative connection to be broken in consequence of this negative result explained above and/or for an error message to be output. A negative result from the check on the associative connection thus prompts an already started associative connection between the electric vehicle and the charging station provided for this purpose to be broken in order to avoid an erroneous association on account of a compromising transmitter.

FIG. 1 shows an electric vehicle EV that has, besides other functional components, not shown, an induction coil C1 on the vehicle and a connecting module AU1 on the vehicle, which are both arranged on the underside of the electric vehicle EV, for example. In the explanations that follow, it is assumed that the electric vehicle EV is approaching an inductive charging station EVSE in order to perform an inductive charge for storage batteries—not shown—of the electric vehicle EV after the electric vehicle EV comes to a standstill or in the course of a slow passage.

The inductive charging station EVSE has, besides other functional components, not shown, a connecting module AU2 at the charging station and an induction coil C2 at the charging station. The latter two functional components AU2, C2 are at the level of, just above or below a roadway level SFC.

After a charging position is reached, an association between the electric vehicle EV and the charging station EVSE is performed using an associative connection, in order to prevent an unauthorized vehicle from being charged.

Figure 2:
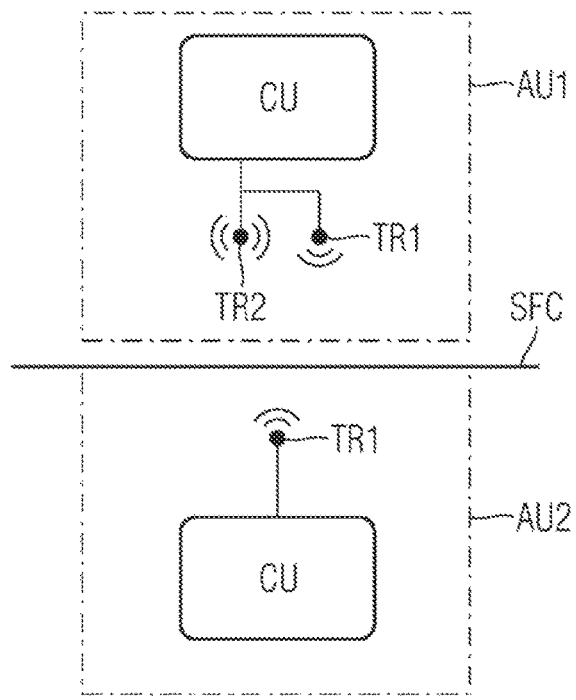
FIG. 2 shows a schematic representation of an example electric vehicle connecting unit in collaboration with a charging station connecting unit, according to one embodiment.

FIG. 2 shows a detail representation of a vehicle connecting module AU1 and a charging station connecting module AU2, which, according to the drawing, is arranged below the roadway level SFC. The arrangement of the two connecting modules AU1, AU2 that is shown in FIG. 2 corresponds to a provided parking position in which the two connecting modules are flush along their main axis. In such a parking position, the vehicle induction coil C1 is also arranged directly above and essentially in congruence with the charging station induction coil C2.

The electric vehicle connecting module AU1 comprises a connecting unit CU, a first transmitter TR1 or antenna TR1 and a second transmitter TR2 or antenna TR2. The charging station connecting module AU2 comprises a connecting unit CU and a first transmitter TR1 or antenna TR1. The respective first transmitter TR1 has an essentially directional transmission characteristic, and the second transmitter TR2 has an essentially omnidirectional transmission characteristic.

In the exemplary embodiment explained according to FIG. 2, the charging station connecting module AU2 has just a first directional transmitter TR1. In an alternative embodiment, not shown, however, an embodiment of the charging station connecting module AU2 that is essentially identical to that of the electric vehicle connecting module AU1 is also possible, that is to say an embodiment in which the charging station connecting module AU2 also comprises a second transmitter TR2 having an essentially omnidirectional transmission characteristic.

Omnidirectional transmitters send or receive nondirectionally, i.e. essentially spherically in the direction of their main axis, and are preferably embodied as a rod antenna. Directional transmitters allow the transmission to be oriented in a prescribable direction. These are preferably embodied as an antenna with a corresponding geometry. Usually, they have a lobe-shaped directional characteristic in the direction of their main axis.

If a compromising transmitter, not shown, is now used to attempt to set up a radio link to the vehicle connecting module AU1, then the compromising transmitter could increase its own transmission strength such that it exceeds the transmission strength of the charging station connecting module AU2. In the prior art, only a first transmitter TR1 having a directional transmission characteristic will be contained in the electric vehicle connecting module AU1. However, such a directional transmitter TR1 alone cannot be used to assess whether the charging station EVSE or the compromising transmitter is the correct connection partner for the associative connection.

The invention therefore provides for a check on the associative connection between the electric vehicle EV and the charging station EVSE by the omnidirectional transmitter TR2 provided in the electric vehicle connecting module AU1.

If the transmission strength received from the second electric vehicle transmitter TR2 has a higher or a much higher value than the transmission strength received from the first electric vehicle transmitter TR1, then a compromising transmitter can be assumed.

After the electric vehicle EV has taken up a parking position in the area of its associated charging station EVSE, the radio link that is to be set up between the charging station EVSE and the electric vehicle EV for the purpose of interchanging positioning, identification and billing information is preferably maintained by means of the respective directional first transmitter TR1.

It is found to be advantageous for the implementation of the invention that popular control units for maintaining radio links to what are known as "wireless interface chips" support a plurality of transmitters and antennas and support dynamic changeover between the antennas. This allows the means according to the invention to be implemented with components that are popular on the market.

In summary, the approach according to the invention provides for a transmitter pair TR1, TR2 having an omnidirectional transmission characteristic and having a directional transmission characteristic to be provided for setting up an associative connection between an electric vehicle EV and a charging station EVSE. After the associative connection has been set up by forming a directional radio link, said radio link is checked by involving an omnidirectional transmitter TR2. This measure allows an undesirable associative connection to a compromising transmitter to be prevented.

What is claimed is:

1. A method for making an associative connection between an electric vehicle and a charging station, the method comprising:
    setting up the associative connection between the electric vehicle and the charging station by forming a directional radio link; and
    checking the associative connection between the electric vehicle and the charging station using an omnidirectional transmitter.

2. The method of claim 1, wherein the directional radio link is formed between a directional transmitter arranged at the charging station and a directional transmitter arranged on the electric vehicle.

3. The method of claim 1, wherein the omnidirectional transmitter is arranged on the electric vehicle.

4. The method of claim 2, wherein the directional transmitter is arranged at a short distance from the omnidirectional transmitter.

5. The method of claim 1, wherein checking the associative connection between the electric vehicle and the charging station includes comparing a transmission strength of the directional radio link with a signal strength of the omnidirectional transmitter.

6. The method of claim 5, comprising outputting a negative result if the transmission strength of the signal transmitted by the omnidirectional transmitter exceeds the transmission strength of the directional radio link.

7. The method of claim 6, comprising breaking the associative connection between the electric vehicle and the charging station in response to the negative result.

8. A connecting unit for establishing an associative connection between an electric vehicle and a charging station, the connecting unit comprising:
    an interface to at least one first transmitter, each first transmitter having an essentially directional transmission characteristic; and
    an interface to at least one second transmitter, each second transmitter having an essentially omnidirectional transmission characteristic;
    wherein the connecting unit is configured to use the first transmitter to set up the associative connection between the electric vehicle and the charging station; and
    wherein the connecting unit is configured to use the second transmitter to check the associative connection between the electric vehicle and the charging station.

9. An electric vehicle, comprising:
a connecting unit comprising:
an interface to at least one first transmitter, each first transmitter having an essentially directional transmission characteristic; and
an interface to at least one second transmitter, each second transmitter having an essentially omnidirectional transmission characteristic;
wherein the connecting unit is configured to use the first transmitter to set up the associative connection between the electric vehicle and the charging station; and
wherein the connecting unit is configured to use the second transmitter to check the associative connection between the electric vehicle and the charging station.

10. A charging station, comprising:
a connecting unit comprising:
an interface to at least one first transmitter, each first transmitter having an essentially directional transmission characteristic; and
an interface to at least one second transmitter, each second transmitter having an essentially omnidirectional transmission characteristic;
wherein the connecting unit is configured to use the first transmitter to set up the associative connection between the electric vehicle and the charging station; and
wherein the connecting unit is configured to use the second transmitter to check the associative connection between the electric vehicle and the charging station.

* * * * *